(12) United States Patent
Hedberg et al.

(10) Patent No.: US 9,661,566 B2
(45) Date of Patent: May 23, 2017

(54) RAN CONTROLLED WI-FI SELECTION

(71) Applicant: TELEFONAKTIEBOLAGET L M ERICSSON (PUBL), Stockholm (SE)

(72) Inventors: Tomas Hedberg, Stockholm (SE); Jari Vikberg, Järna (SE); Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 34 days.

(21) Appl. No.: 14/650,029

(22) PCT Filed: Dec. 7, 2012

(86) PCT No.: PCT/EP2012/074854
§ 371 (c)(1),
(2) Date: Jun. 5, 2015

(87) PCT Pub. No.: WO2014/086434
PCT Pub. Date: Jun. 12, 2014

(65) Prior Publication Data
US 2015/0319686 A1 Nov. 5, 2015

(51) Int. Cl.
*H04W 48/20* (2009.01)
*H04W 84/12* (2009.01)
(52) U.S. Cl.
CPC ............ *H04W 48/20* (2013.01); *H04W 84/12* (2013.01)
(58) Field of Classification Search
CPC . H04W 72/0453; H04W 84/12; H04W 88/08; H04W 36/14; H04W 48/20; H04B 17/24
See application file for complete search history.

(56) References Cited

U.S. PATENT DOCUMENTS

2008/0096560 A1 4/2008 Felske
2008/0102839 A1* 5/2008 Kurokawa ........ H04W 36/0083
455/439

(Continued)

OTHER PUBLICATIONS

3GPP TS 23.402 V11.3.0; 3rd Generation Partnership Project; Technical Specification Group Services and System Aspects; Architecture enhancements for non-3GPP accesses (Release 11); Jun. 2012.

*Primary Examiner* — Ayaz Sheikh
*Assistant Examiner* — Debebe Asefa

(57) ABSTRACT

Methods and apparatus are provided for operating a network entity in a communications network. The communications network includes a radio access network including a base station serving a user equipment, and a wireless network including wireless access points. A set of available wireless access points are selected from the wireless access points based on network information associated with radio access network resources, core network part resources, and/or wireless network resources. Wireless access point information associated with the characteristics of the set of available wireless access points is generated for use by the user equipment to access the available wireless access points. The network entity transmits the wireless access point information via base station to the user equipment. The wireless access point information may include rules or conditions for use by the user equipment in determining an available wireless access point to access.

28 Claims, 9 Drawing Sheets

(56) References Cited

U.S. PATENT DOCUMENTS

2009/0207812 A1    8/2009  Gupta
2010/0003980 A1    1/2010  Rune
2011/0286437 A1*  11/2011  Austin .................... H04W 4/02
                                                            370/338

* cited by examiner

RAN CONTROLLED WI-FI SELECTION

This application is a 371 of PCT/EP2012/074854, filed Dec. 7, 2012, the disclosure of which is fully incorporated herein by reference.

TECHNICAL FIELD

The present invention relates to methods and apparatus for transmitting an indication of available wireless access points (APs) of a wireless network to a user equipment (UE) via a radio access network (RAN) for use by the UE in accessing the wireless network.

BACKGROUND

Mobile operators are beginning to use wireless networks such as wireless local area networks based on the IEEE standard 802.11 or Wi-Fi networks to offload traffic from radio access networks (RAN) or mobile networks such as, for example, Global System for Mobile Communications (GSM), cdma2000, Wideband Code Division Multiple Access (W-CDMA) and Long Term Evolution (LTE)/LTE Advanced (e.g. 2G/3G/4G and beyond). Most of the current Wi-Fi deployments are totally separate from mobile networks, and are regarded as non-integrated. The usage of Wi-Fi is mainly driven due to the free and wide unlicensed spectrum and the increased availability of Wi-Fi technologies in UEs. In addition, the end user is more proficient at using Wi-Fi, for example, at their homes and offices.

UE as described herein may comprise or represent any device used for wireless communications. Examples of user equipment that may be used in certain embodiments of the described wireless and mobile networks are wireless devices such as mobile phones, mobile terminals, terminals, stations (e.g. in the IEEE 802.11 standard a UE may be a station (STA)), smart phones, portable computing devices such as lap tops, handheld devices, tablets, net books, computers, personal digital assistants, machine-to-machine devices such as sensors or meters (e.g. wireless devices in which there is no end user associated with the device), and other wireless communication devices that may connect to wireless and/or mobile networks.

The different business segments for Wi-Fi regarding integration possibilities can be divided into mobile operator hosted/controlled vs. 3rd party hosted/controlled Wi-Fi access points. A 3rd party is considered to be anything else other than the mobile operator, 3rd party APs are typically not totally "trusted" by the mobile operator. A 3rd party could be, for example, a Wi-Fi operator or even an end-user. In both segments there exist public/hotspot, enterprise and residential deployments.

There are various types of Wi-Fi integration to mobile networks, for simplicity, the notation of 3rd Generation Partnership Project (3GPP) networks using System Architecture Evolution (SAE)/LTE nodes are described. However, similar or like network entities or nodes may be used in any other mobile network, for example, 2G/3G/4G and beyond mobile networks such as GSM, W-CDMA, Universal Mobile Telecommunications System (UMTS) Terrestrial Radio Access Network (UTRAN), Enhanced-UTRAN, LTE, and LTE-Advanced.

Wi-Fi integration towards the mobile core network (also known as cellular core network) is emerging as a good way to improve the end user experience further between the cellular and Wi-Fi accesses of each operator. These solutions consist mainly of the components: common authentication between 3GPP and Wi-Fi, and integration of Wi-Fi user plane traffic to the mobile core network. The common authentication is based on automatic SIM-based authentication in both access types. The Wi-Fi user plane integration provides the mobile operator the opportunity to provide the same services, like parental control and subscription based payment methods, for the end users when connected both via 3GPP and via Wi-Fi. Different solutions are specified in standardized in 3GPP Technical Specification 23.402, and may include overlay solutions (S2b, S2c) and integrated solutions (S2a), which are currently being further developed (S2a, S2b, S2c indicating the 3GPP interface/reference point name towards the packet data network (PDN) Gateway (PDN-GW)).

FIG. 1a illustrates a simplified network architecture for a communication system 100 including a mobile network (also known as a cellular network), where the mobile network includes RAN 102 and core network 103 parts. The mobile network is illustrated as being integrated with a wireless network 104. The core network part 103 is represented by the dotted line area and the RAN 102 is represented by the dashed-dot area. The wireless network 104 is represented by the dashed area. In this example, the mobile network is a LTE based network and the RAN 102 includes an eNodeB 108 that is connected via the S1-interfaces (e.g. S1-MME and S1-U) to a Mobility Management Entity (MME) 115 and a Serving Gateway (SGW) 116, respectively, of the core network part 103. The core network part 103 also includes, among other network nodes and elements, a Home Subscriber Server 121 (HSS) and Proxy-Call Session Control function (P-CSCF) 122. The eNodeB 108 serves or supports network cell 106 indicated by the dashed-double-dot area. The wireless network 104 in this example is a Wi-Fi AN that is connected to the PDN-GW 117 of core network part 103 via an S2a interface and to the 3GPP Authentication, Authorization and Accounting (AAA) Server 119 via the STa interface.

The wireless network 104 includes access point 112, which is a Wi-Fi APs. The network cell 106 and the wireless network 104 include a first UE 110. The eNodeB 108 supports or serves the first UE 110. As shown, the first UE 110 is in communication with the eNodeB 108 of RAN 102 and is in communication with the wireless network 104 via Wi-Fi AP 112. The wireless AP 112 is connected to a wireless access controller (AC) 113, which in this example is a Wi-Fi AC. The wireless AC 113 is may connect the wireless network 104 to further IP Networks (e.g. the Internet) directly or via PDN GW 117 via core network part 103. The wireless AC 113 is also in communication with the 3GPP AAA Server 119, for use in authorizing the UE 110 in accessing the mobile network via the wireless network 104.

Although the above describes one deployment option, it is to be appreciated by the person skilled in the art that there are multiple deployment options for integrating a mobile network with a wireless network. Some examples may include: connecting the wireless AC 113 to a Broadband Network Gateway (BNG) (not shown) to connect the wireless network 104 to the further IP networks 118 and PDN GW 117; collocating the wireless AP 112 with a Residential Gateway (RG), deploying the wireless AP 112 and wireless AC 113 without a BNG as in the example above; or even deploying the wireless AP 112 with an RG and a BNG but without an wireless AC 113. In addition, it is to be appreciated that there are multiple options for terminating/connecting the S2a interface. Some further examples include, connecting the S2a interface between a wireless AP 112/RG and PDN GW 117; between wireless AC 113 and PDN GW 117 (as shown in the FIG. 1a example); between BNG and PDN GW 117; or between a dedicated Trusted wireless local area network (WLAN) Access Gateway (TWAG) and PDN GW 117.

In essence, legacy UEs with Wi-Fi capability may access the wireless network 104 either directly or automatic SIM-based authentication in both access types, which guarantees the users are accessing a legitimate wireless AP. As discussed above, different standards organizations have started to recognize the need for an enhanced user experience for Wi-Fi access, which is being driven by 3GPP operators. An example of this is the Wi-Fi Alliance with the Hot-Spot 2.0 (HS2.0) initiative, now officially called PassPoint. HS2.0 is primarily geared toward Wi-Fi networks. HS2.0 builds on IEEE 802.11u, and adds requirements on authentication mechanisms and auto-provisioning support. 3GPP operators are trying to introduce additional traffic steering capabilities, leveraging HS2.0 802.11u mechanisms. HS 2.0 uses the Access Network Query Protocol (ANQP) as part of the wireless access network discovery and selection function. This provides a mechanism for UEs (and legacy UEs) to request different information from APs before association with those APs, this request is carried by Generic Advertisement Services (GAS) protocol.

In addition, an Access Network Discovery and Selection Function (ANDSF) is a 3GPP defined function that provides the possibility to send different policies to a UE for network discovery and selection. FIG. 1b illustrates the communication between a UE 110 that has been enhanced to include an ANDSF client (not shown) and an ANDSF server 120 via an IP-based S14-interface. Access Discovery Information is used to provide access discovery information to the UE 110, which can assist the UE 110 to discover available 3GPP and non-3GPP access networks without the burden of continuous background scanning. Inter-System Mobility Policies (ISMP) are policies which guide the UE 110 to select the most preferable 3GPP or non-3GPP access. The ISMP are used for UE 110 that access a single access (3GPP or Wi-Fi) at a time. Inter-System Routing Policies (ISRP) are policies which guide the UE 110 to select over which access a certain type of traffic or a certain APN shall be routed. The ISRP are used for UEs 110 that access both 3GPP and Wi-Fi simultaneously.

However, the main principle for the solutions (e.g. SIM based authentication) targeting UEs and legacy UEs, is to take action to reject/accept the access attempt only at or during the UE's Wi-Fi access attempt. These solutions are called target side based solutions. The actions can be either to reject or accept the access attempt. In the case of access rejection, the primary issue is the delay in finding a wireless network or wireless AP that is acceptable for providing access. The solution describing the ANDSF mechanism is a source side based solution, where an enhanced UE uses the received policies on the source side as a guideline before attempting to access an available network e.g. Wi-Fi. However, ANDSF solutions are only focused on supplying information of all available networks, which may not necessarily be optimal in terms of network load or dynamic changes of network load. The existing ANDSF mechanism and enhanced UE with ANDSF client are not suited for sending and receiving dynamic policies to the UE should network load or accessibility to a network change.

Therefore, there is a significant need to provide a mechanism for efficiently providing the dynamic wireless AP information to a UE that optimizes the available network and wireless access communication resources.

SUMMARY

It has been recognised here that whilst there are certain mechanisms for providing a UE with network information for use in accessing a RAN or wireless AN, none of the relevant systems can take into account dynamic changes in the available RAN and wireless network communication resources to efficiently provide a UE with network information for accessing available RANs or wireless ANs. The present invention provides the advantages of taking into account changes in the RANs/wireless ANs using available RAN/wireless network information and parameters to more accurately determine the appropriate RANs and wireless ANs for the UE to access.

According to a first aspect of the invention there is provided a method of operating a network entity in a communications network. The communications network comprising a radio access network (RAN) and a wireless network or wireless network. The RAN including a base station serving a UE. The wireless network including one or more wireless access points (APs). The method includes selecting a set of available wireless APs from the one or more APs for use by the UE based on available network information associated with RAN and wireless network resources. Generating wireless AP information associated with the characteristics of the set of available wireless APs for use in applying with access rules to the available wireless APs. Transmitting the wireless AP information via the base station to the UE.

As an option, the step of transmitting includes broadcasting a first portion of the wireless AP information in broadcast system information. Additionally, the first portion of wireless AP information includes non-UE-specific wireless AP information for use in applying access rules when accessing the set of available wireless APs. As an option, the first portion includes at least one minimum received signal strength indication (RSSI) associated with one or more of the available wireless APs for use by the UE when accessing an available wireless AP satisfying the minimum RSSI.

As another option, the step of transmitting includes transmitting a second portion of the wireless AP information using dedicated signalling between the UE and the RAN. Additionally, the second portion of the wireless AP information transmitted using dedicated signalling is based on further network information associated with the UE context in the RAN and/or a core network part of the communication network to provide specific rules for the UE when accessing one of the available wireless APs. As an option, the UE context in the RAN and/or the core network part of the communication network includes UE information associated with at least one of the UE subscription; the UE capabilities; mobility of the UE; radio conditions specific to the UE; and any other RAN information or resources associated with the UE. Additionally or alternatively, the second portion of wireless AP information includes preference information associated with whether access to an available wireless AP is preferred or not.

Optionally, the wireless AP information includes one or more rules or conditions for use by the UE in accessing a wireless AP from the set of wireless APs. As another option, the wireless AP information is used by an existing set of rules in the UE for use in accessing a wireless AP from the set of wireless APs. As an option, the step of generating further includes generating one or more rules or conditions for use by the UE in accessing the set of wireless APs based on a set of defined rules or conditions or operator policies and the network information. Operator policies may be configuration settings in the network entity for setting the rules/conditions based on the network information.

As an option, the wireless access point information includes one or more of the following characteristics or rules: an indication of whether or not a set of available wireless APs exist in within the coverage area or cell of the base station serving the UE; radio band information associated with the available wireless APs; identity information associated with each available wireless AP; at least one minimum RSSI associated with one or more of the available wireless APs for use by the UE to access an available wireless AP satisfying the minimum RSSI; providing a minimum RSSI for each available wireless AP; and preference information associated with whether access to an available wireless AP is preferred or not.

As another option, the step of selecting the available wireless APs is based on network information comprising at least one from the group of: RAN resources including the radio access network load on the base station serving the UE; wireless network resources including the wireless network load on the one or more wireless access points; the type of radio access network serving the UE; RAN resources associated with at least the base station serving the UE; wireless network resources associated with the one or more wireless access points; and communication network or core network part resources associated with user traffic, a user subscription associated with the UE, or service information.

As an option, the wireless AP are Wi-Fi wireless AP or wireless APs operating based on the IEEE 802.11 standard.

As an option, the method includes receiving one or more further sets of wireless APs or further network information from one or more further network entities, and the step of generating further includes generating the set of wireless APs based on the received further network information or further sets of wireless APs. As another option, the method includes transmitting the generated set of wireless APs and/or said network information to one or more further network entities within the communication system.

Optionally, the method includes receiving further network information from one or more further network entities, updating the network information with the further network information. As an option, the step of selecting further includes selecting further sets of available wireless APs based on the updated network information, and the step of generating further includes generating the further wireless AP information based on the further sets of available wireless APs. The step of transmitting further includes transmitting the at least a portion of said network information to the one or more further network entities and the step of transmitting further includes transmitting the at least a portion of said wireless AP information to the UE via the base station.

According to a second aspect of the invention there is provided a method for operating a UE in a communications network. The communications network comprising a RAN and a wireless network. The RAN including a base station serving the UE. The wireless network including one or more wireless APs. The method includes receiving, from a network entity in the communications network via the base station, wireless AP information associated with a set of available wireless APs from the one or more wireless APs. Determining the available wireless APs the UE can access based on applying the wireless AP information with access rules for accessing the available wireless APs. Storing wireless network access information associated with the determined available wireless APs, the wireless network access information for use by the UE when accessing the wireless network via the determined available wireless APs.

According to a third aspect of the invention there is provided a network entity for use in a communications network. The communications network comprising a RAN and a wireless network. The RAN including a base station serving the UE. The wireless network including one or more wireless APs. The network entity comprising a processor, a receiver, a transmitter, and a memory, the processor being coupled to the receiver, the transmitter and the memory. The processor is configured to select a set of available wireless APs from the one or more wireless APs for use by the UE based on network information associated with the RAN resources and the wireless network resources. The processor is further configured to generate wireless AP information associated with the characteristics of the set of available wireless APs for use in applying access rules to access the set of available wireless APs. The transmitter is configured to transmit the wireless AP information via the base station to the UE.

As an option, the transmitter is configured to broadcast a first portion of the wireless AP information in broadcast system information. Additionally, the first portion of wireless AP information includes non-UE-specific wireless AP information for use with the access rules when accessing the set of available wireless APs.

Optionally, the transmitter is configured to transmit a second portion of the wireless AP information using dedicated signalling between the UE and the RAN. Additionally, the second portion of the wireless AP information transmitted using dedicated signalling is based on network information associated with the UE context in the RAN or core network part of the communications network for use with specific access rules for the UE when accessing one of the set of available wireless APs.

Optionally, the wireless AP information includes one or more rules or conditions for use by the UE in accessing a wireless AP from the set of wireless APs. As another option, the wireless AP information is used by an existing set of rules on the UE for use in accessing a wireless AP from the set of wireless APs. As an option, the processor is further configured to generate one or more rules or conditions for use by the UE in accessing the set of wireless APs based on a set of defined rules or conditions (or operator policies) and the network information.

As another option, the wireless AP information includes one or more of the following characteristics or rules/conditions: an indication of whether or not a set of available wireless APs exist in a coverage area or a cell of the base station serving the UE; radio band information associated with the set of available wireless APs; identity information associated with each available wireless AP; at least one minimum RSSI associated with one or more of the available wireless APs for use by the UE when accessing an available wireless AP satisfying the minimum RSSI; providing a minimum RSSI for each available wireless AP; and preference information associated with whether access to an available wireless AP is preferred or not.

As an option, the processor is further configured to select the available wireless access points based on network information comprising at least one from the group of: RAN resources including the RAN load on the base station serving the UE; type of radio access network serving the UE; wireless network resources including the wireless network load on the one or more wireless APs; RAN resources associated with at least the base station serving the UE;

wireless network resources associated with the one or more wireless APs; and communication network or core network part resources associated with user traffic, a user subscription associated with the UE, or service information.

Optionally, the receiver is configured to receive network information from the RAN. As an option, the receiver is further configured to receive network information from the wireless network. As another option, the receiver is further configured to receive network information from a core network part of the communications network. The memory is configured to store the received network information.

As an option, the network entity may be included in a base station serving the UE and/or a wireless AP. The network entity may be included in a pico base station comprising a RAN base station and a wireless AP.

As an option, the receiver and processor are configured to receive further sets of wireless APs and/or further network information from one or more further network entities within the communication system. The processor is further configured to generate the set of wireless APs based on the received further network information or further sets of wireless APs. As another option, the transmitter and processor are further configured to transmit the sets of wireless APs and/or said network information to one or more further network entities within the communication system. The processor is further configured to generate the set of wireless APs based on the received further network information or further sets of wireless APs.

Optionally, the receiver is configured to receive further network information from one or more further network entities. The processor is further configured to update the network information with the received further network information for use in selecting sets of wireless APs and generating further wireless AP information. The transmitter may be further configured to transmit the at least a portion of the updated network information to the one or more further network entities. The transmitter may be further configured to transmit the further wireless AP information to the UE via the base station.

As an option, the functionality of the network entity may be included as a network entity function in one or more base station controllers (BSC), one or more radio network controllers (RNC), and/or one or more base stations, wherein each network entity function is in communication with other network entity functions for receiving/transmitting information associated with RAN resources and/or wireless network resources in the communication network or in the vicinity of each network entity function.

According to a fourth aspect of the invention there is provided a UE for use in a communications network. The communications network comprising a RAN and a wireless network. The RAN including a base station serving the UE. The wireless network including one or more wireless APs. The UE comprising a processor, a receiver, a transmitter and a memory, the processor being coupled to the receiver, the transmitter and the memory. The receiver is configured to receive, from a network entity in the communications network via the base station, wireless AP information associated with a set of available wireless APs from the one or more wireless APs. The processor is configured to determine the available wireless APs the UE can access based on applying the wireless AP information with access rules associated for accessing the available wireless APs; and the memory is configured to store wireless network access information associated with the determined available wireless APs. The wireless network access information for use by the processor and transmitter when the UE accesses the wireless network via a determined available wireless AP. As an option, the transmitter may comprise a transmitter for communicating with the RAN via a base station and a transmitter for communicating with a wireless AP.

The invention provides the advantages of providing dynamic indications to the UE about the availability of access to wireless APs such as Wi-Fi, where the indications are based on network information such as RAN information available, core network part information, and/or wireless network information available. The present invention provides the further advantage that the dynamic indications are provided to the UE using RAN broadcast and/or signaling minimizing the requirement for further deployment of radio resources and the indications can be customized for each UE in a communication system allowing granularity in optimizing the communication resources of the RAN, core network parts, and/or the wireless network.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

Figure 1A:
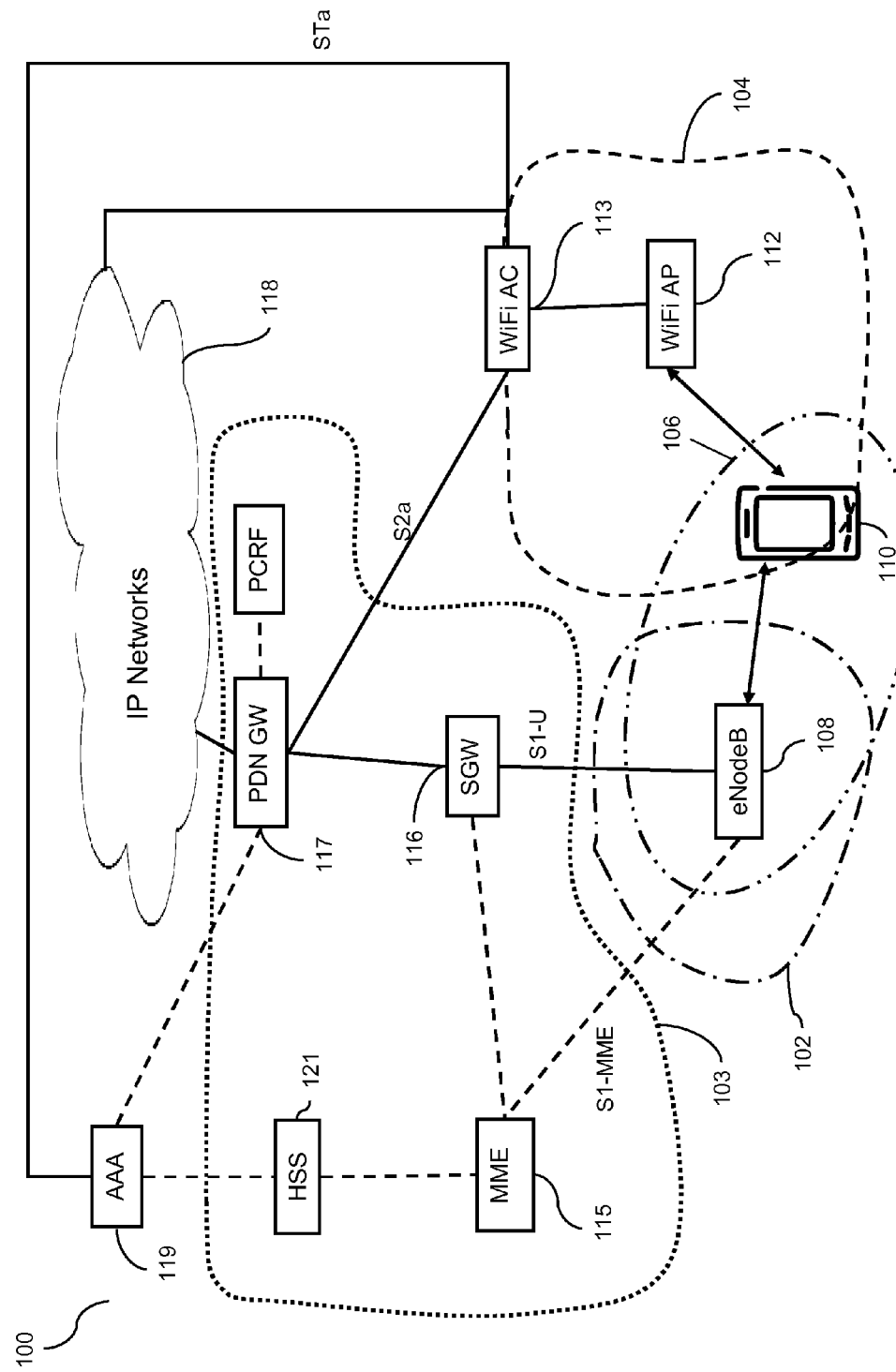
FIG. 1a is a schematic illustration of a communication system including a RAN with a wireless AN.
Figure 1B:
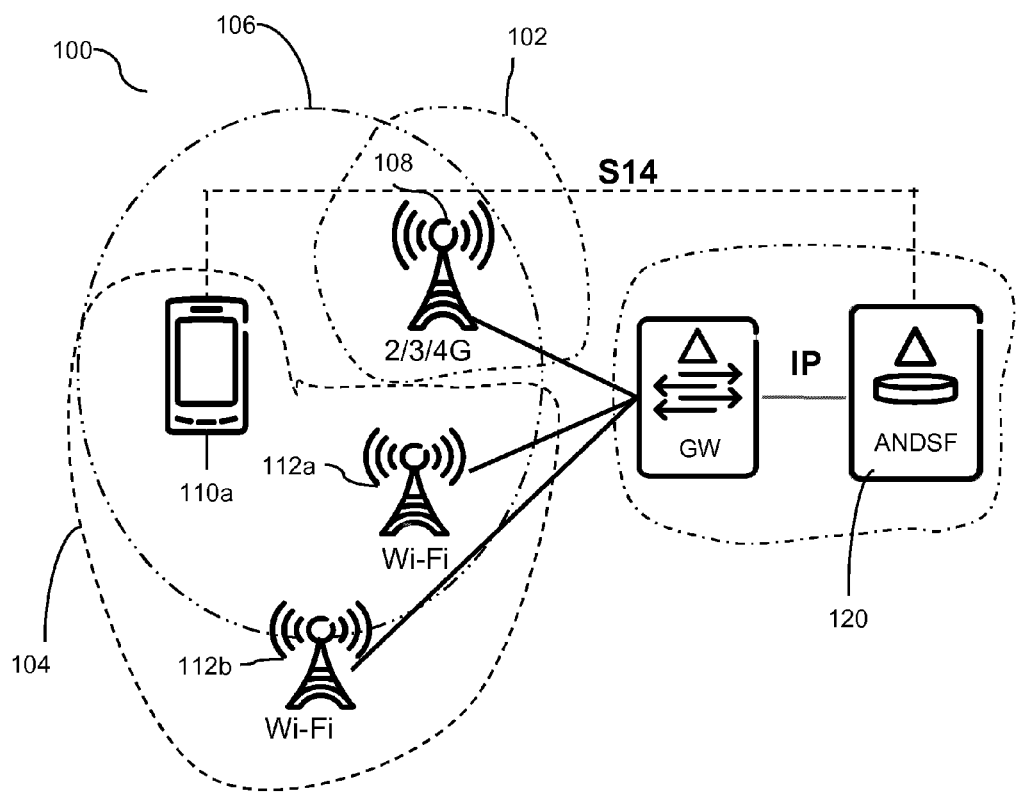
FIG. 1b is a schematic illustration of another example of a communication system including a RAN and wireless AN.

In order to overcome the problems identified above with present integrated information solutions based on determining acceptance during a access request or transmitting all wireless network access information to UEs, methods and apparatus or network entities are described herein for dynamically determining wireless AP information for use by a UE in accessing wireless networks. Current methods for integration of wireless access networks into RANs (e.g. Wi-Fi into 3GPP networks) as described with respect to FIGS. 1a and 1b do not offer good support for network controlled Wi-Fi/3GPP RAN access selection and service mapping. It has been recognised that more and more devices are using wireless networks (e.g. wireless local area networks (WLANs)) and that these wireless networks may alleviate load on RANs, therefore as UE receives an indication of the available wireless APs it is more important for UEs to receive an indication of suitable available wireless APs providing efficient and seamless access to wireless networks.

The basic concept of the invention is a network entity or mechanism for providing dynamic indications to a UE about the availability of access to wireless networks such as IEEE 802.11 based wireless networks (e.g. Wi-Fi). These indications are based on network information such as, but not limited to, current RAN information (or information associated with RAN resources) available, core network part information (or information associated with core network resources), user subscriptions or profiles, service information associated with the UE, wireless network information (or information associated with wireless network resources), and/or or radio access related input parameters (e.g. UE mobility, RAN and wireless access (e.g. 3GPP/Wi-Fi) cell and network load, radio link performance, and other network parameters etc.). The indications are provided to the UE using RAN network signalling either as part of system information or as part of UE-specific dedicated signalling. The network information may be used by the network entity to determine a suitable set of wireless APs that are most likely accessible to the UE such that refusals are minimized when the UE requests access to an available wireless AP. This reduces delays by the UE gaining access to IP networks via a wireless network. In addition, as the selection of available wireless APs is based on network information then by using this set of APs, the UE may be able to access a wireless AP that optimises the network load in the communications system.

There may be two different levels of integration of RANs and wireless networks (or wireless ANs) that could be implemented either separately or together. A so-called first level of integration is to combine both RAN technologies and wireless network technologies such as 3GPP and Wi-Fi (or IEEE 802.11), respectively, into small pico base stations to gain access to Wi-Fi sites with 3GPP technology and vice versa. A so-called second level of integration is to integrate the wireless network access (e.g. Wi-Fi access) tighter into the RAN by introducing enhanced network controlled traffic steering between RANs (e.g. 3GPP RANs) and wireless networks (e.g. Wi-Fi) based on knowledge about the total situation on the different types of network access. The second level of integration can avoid the potential issues with UE controlled wireless access selection (Wi-Fi selection) e.g. selecting Wi-Fi when the Wi-Fi connection is bad or when the UE is moving. This type of control will further provide improved end user performance and use or the network load of the combined wireless and cellular radio network resources.

Figure 2A:
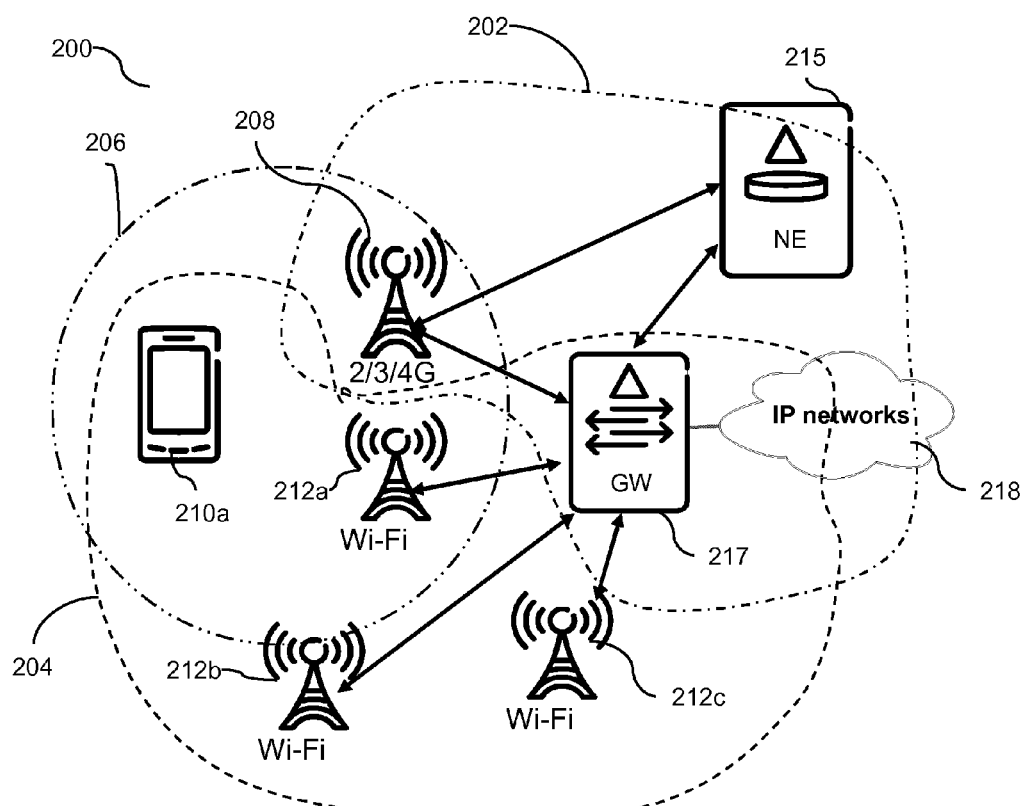
FIG. 2a is a schematic illustration of an example network entity according to the invention in a communication system including one or more RAN(s) and wireless AN.
Figure 2B:
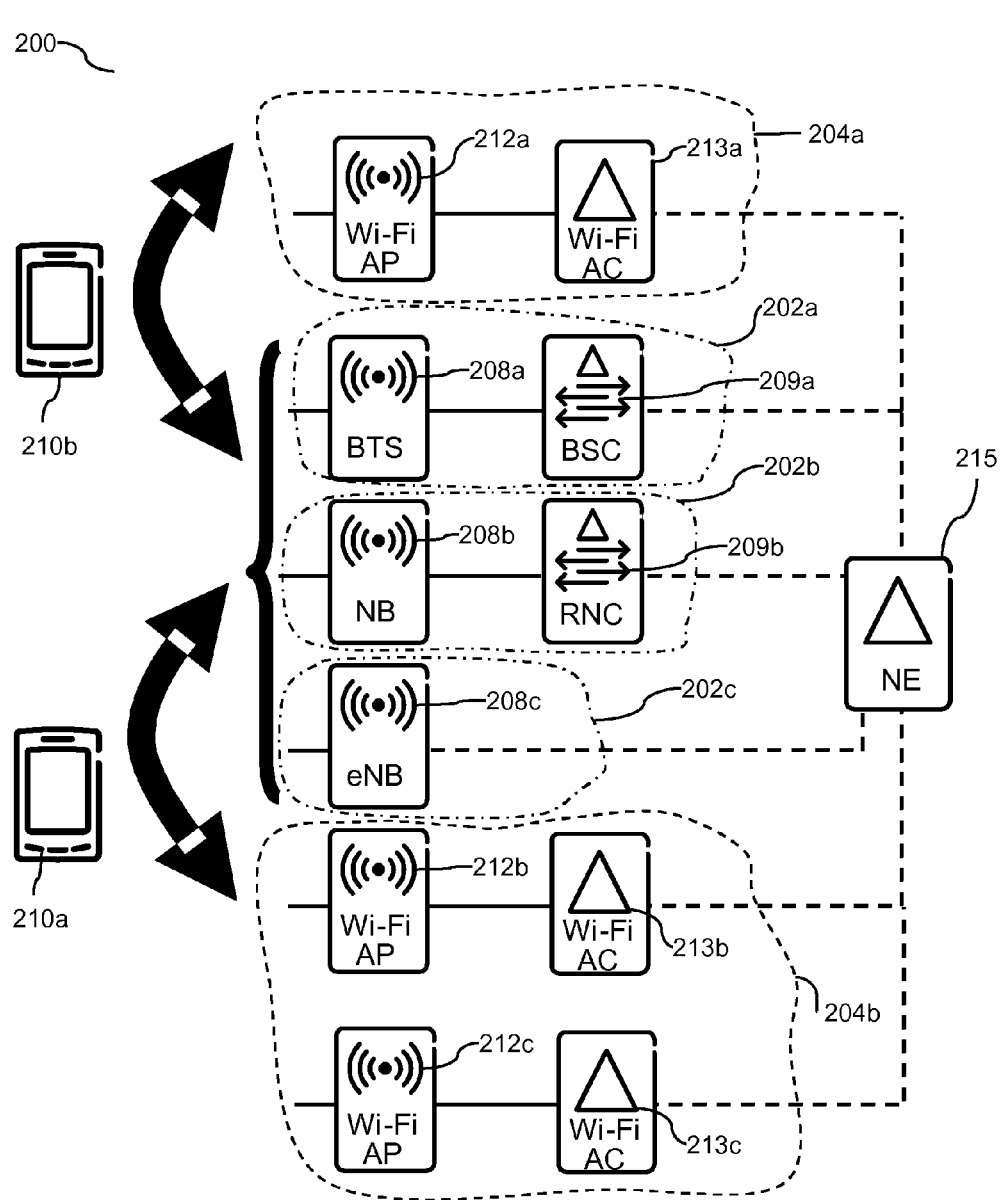
FIG. 2b is a schematic illustration of another example network entity according to the invention in a communication system including several RANs and wireless AN.
Figure 2C:
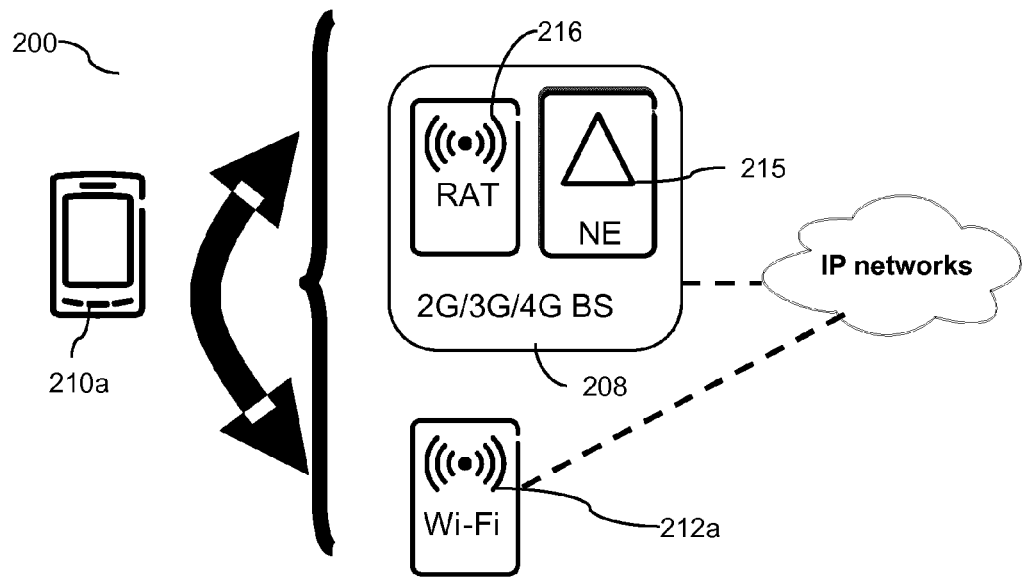
FIG. 2c is a schematic illustration of a further example network entity according to the invention in a communication system including a RAN and a wireless AN.
Figure 2D:
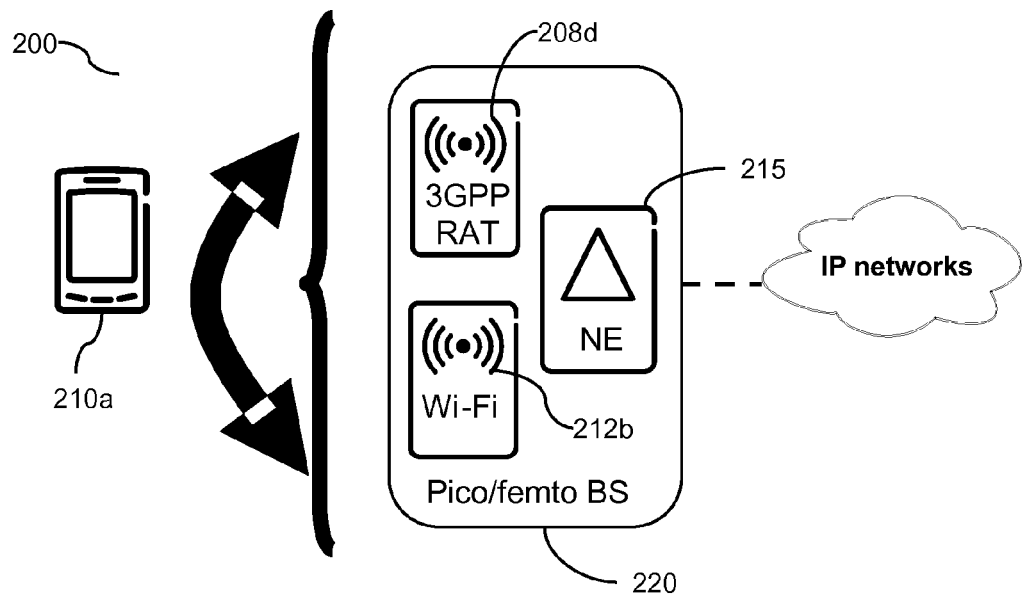
FIG. 2d is a schematic illustration of an additional example network entity according to the invention in a communication system.

FIG. 2a is a schematic illustration of a communication system 200 including an example network entity 215 according to the invention. The communication system 200 includes a UE 210a in communication with a RAN 202 and/or a wireless network 204. For simplicity, the same or similar reference numerals used in FIG. 2a are reused in FIGS. 2b, 2c, and 2d identifying the same or similar UEs, network nodes, elements or entities and the like. FIG. 2b is a schematic illustration of another communication system 200 including a network entity 215 according to the invention, the communication system 200 including first and second UEs 210a and 210b in communication with at least one of several RANs 202a, 202b, 202c and/or several wireless networks 204a and 204b. FIG. 2c is a schematic illustration of a base station 208 including the functionality of an example network entity 215 according to the invention. FIG. 2d is a schematic illustration of a base station 220 supporting both cellular RAT and wireless network access RAT including the functionality of an example network entity 215 according to the invention.

Referring to FIG. 2a, in this example, the RAN 202 may be a 2G, 3G or 4G and beyond based RAN that includes cell 206 and a base station 208 serving UE 210a. The RAN 202 is in communication with the network entity 215. The wireless network 204 includes a first, second and third wireless AP 212a, 212b, and 212c that are based on Wi-Fi or the IEEE 802.11 standard. In this example, the base station 208 and wireless APs 212a-212c are in communication with other IP networks 218 via gateway 217, and may be in communication with network entity 215 either directly or via gateway 217.

Although this example describes one deployment option, it is to be appreciated by the person skilled in the art that there are multiple ways and arrangements of network elements for connecting network entity 215 with base station 208 and wireless APs 212a-212c. Some examples may include: (with reference to FIG. 1a) connecting the wireless AC 213 directly to a PDN GW 117, where the PDN GW 117 is in communication with the network entity 215; or connecting the wireless AC 213 to a PDN GW 117 via a BNG, where the PDGN GW 117 is in communication with the network entity 215. In essence, the network entity 215 is connected or located in the communication system 200 such that it is in communication with the base station 208 and wireless AC 213 or APs 212a-212c.

In operation, network entity 215 generates dynamic indications that are representative of wireless AP information that indicate to the UE 210a the most likely wireless network(s) 204 and wireless APs 212a-212c that the UE can access. The dynamic indications or wireless AP information may be generated by using network information associated with RAN resources, core network part resources, and/or wireless network resources. This network information (the input parameters) may be communicated to the network entity 215 from the RAN 202, core network parts (not shown), and/or the wireless network 204.

The network information may comprise or represent any data associated with the resources of a communications system 200. Examples of network information that may be used in certain embodiments of the described network(s) is network information associated with RAN resources, wireless network resources, and/or core network part resources. RAN resources may include, but not limited to, network information associated with radio access related input parameters like UE mobility, RAN access (e.g. 3GPP) cell, network load, cell loads, radio link performance and other network parameters etc. Wireless network resources may include, but is not limited to, network information associated with radio access related input parameters like wireless access (e.g. Wi-Fi) information and wireless network load (e.g. Wi-Fi cell load), wireless AP radio link performance and other wireless network or wireless AP parameters such as radio frequency bands, service sets, basic and/or extended service sets, service set identifiers, received signal strength indications (RSSI), basic service set load information, discovery information, identification of operator of wireless network, etc. Core network part resources may include, but is not limited to, user information including but not limited to, user subscription/profiles, subscription information, service information (e.g. applications used by the end users or by the corresponding UE), user plane traffic, network loads, and other information associated with the core network parts that may assist network entity 215 in generating wireless AP information.

For example, depending on the type of RAN 202 (e.g. 2G/3G/4G and beyond), network elements or nodes in the RAN 202 such as the BSCs, RNCs, eNBs may communicate network information associated with at least RAN resources to the network entity 215. In the wireless network 204, the wireless AC 213 and/or the Wi-Fi APs 212a-212c may communicate network information associated with at least the wireless network resources to the network entity 215. The core network parts (not shown) or service network nodes (not shown) of the communication system 200 may also communicate network information associated with core network resources. For example, if the RAN 202 is part of an LTE based network such as that of FIG. 1a, then core network nodes such as the MME 115, Serving GW 116, PDN GW 117, and HSS 121 may provide network entity 215 with network information associated with core network resources. Other core network nodes may include Serving GPRS Support Nodes, Gateway GPRS Support Nodes or Home Location Registers (HLRs) may also provide similar network information. In addition, core network nodes and/or service network nodes that may inspect user traffic (e.g. network nodes with Deep Packet Inspection in the (S)Gi-interfaces for inspecting the user plane traffic) may communicate network information associated with network loads etc or related communication network resources to network entity 215.

In any event, network entity 215 receives network information associated with RAN resources, core network part resources, and/or wireless network resources to allow it to make decisions on generating the appropriate wireless AP information to send to UE 210. The generated wireless AP information will allow UE 210 to determine, among other things but not limited to, whether to access wireless network 204 or not and/or which wireless AP from the available wireless APs 212a-212c is the best to use when accessing wireless network 204.

The network entity 215 provides the dynamic indications to the UE via different radio routes in the RAN 202 that serves the UE 210a. For example, the wireless AP information may be transmitted to the UE 210a via the RAN 202 broadcasting the wireless AP information to one or more UEs via base station 208. The wireless AP information may also be transmitted to the UE 210a via the RAN 202 transmitting the wireless AP information directly to the UE 210a via the base station 208 using specific signalling to the UE 210a.

The network entity 215 may receive UE non-specific and UE-specific information from the RAN 202, core network parts, and/or wireless network 204 that enable network entity 215 to take decisions as to whether the UE 210a should access the wireless network 204 (e.g. Wi-Fi network) or not depending on the state of the UE 210a. For example, the network entity 215 may indicate to the UE 210a when UE 210a is stationary the suitable wireless APs 212a-212c that are accessible. Alternatively or in addition, the indication may be based on which wireless APs 212a-212c the UE 210a may have a good connection to. The decision can then be signaled to the UE 210a via the RAN 202 or executed internally in the RAN 202 (e.g. 3GPP)/wireless access network 204 (e.g. to control UE admission to the wireless access network).

As an example, generic wireless AP information required by all UEs may be broadcast and specific wireless AP information that is specific to UE 210a can be sent directly to the UE 210a via dedicated RAN signalling etc. In another example, non-UE specific wireless AP information can be sent to all UEs to provide rules, or data for use with rules, for determining when wireless network access (e.g. Wi-Fi access) should be used by the UE 210a. UE-specific wireless AP information may be generated by network entity 215 based on network information received from the RAN 202, core network parts, and/or wireless network 204 that is specific to UE 210a such as, for example, subscription information, UE capabilities or radio conditions. For example, network information associated with a UE that has a user such as a mobile telephone or laptop may include subscription information or information associated with the UE profile. As another example, network information associated with a UE that does not have a user, for example, machine-machine devices like sensors or meters may include UE capabilities and/or radio conditions as these devices may not necessarily have a user subscription or profile. In any event, the network information that is specific to the type of UE 210a may be used to generate UE-specific wireless AP information.

The network entity 215 may send the specific wireless AP information to provide rules, or data for use with rules present on the UE 210a, for further determining when or how UE 210a may access the wireless network 204 via one or more suitable wireless AP(s) 212a-212c. For UE specific information, the UE context in the RAN 202 (e.g. 3GPP RAN) or core network part is required, for example, the RAN holds information about radio performance, UE mobility etc. on the RAN side. Similarly, the UE context in the wireless network side may include UE specific information related to RSSI power levels with each of the available wireless APs 212a-212c, etc, which may also be used in determining suitable available wireless APs 212a-212c the UE 210a may use.

In essence, the wireless AP information includes data and/or rules allowing the UE 210a to select the most suitable wireless APs. The wireless AP information is generated by the network entity 215 based, but not limited to, network information associated with RAN information such as network load, core network information such as user profiles/subscriptions and service information, whether wireless network access is preferred, wireless AP preference, and/or based on the minimum RSSI of each wireless AP accessible by the UE.

By way of example only, the wireless AP information provided to the UE 210a may include one or more of the following pieces of information:

A. Information indicating that an operator wireless network exists (e.g. Wi-Fi exists), or not, in the current RAN cell area 206. This allows the UE 210a to reduce power consumption (e.g. save battery) because the wireless access transmitter (e.g. Wi-Fi radio) of the UE 210a can only be activated when needed;

B. The radio band(s) used for the operator wireless network. The UE 210a will further reduce power consumption by not activating its wireless network technology (e.g. Wi-Fi) to search for Service Set identifiers (SSIDs) or for performing ANQP queries, if the allowed wireless network is on bands that the UE 210a does not support;

C. The minimum RSSI of wireless APs 212a-212c that is required before UE 210a is allowed to access the associated wireless network 204. This will further reduce power consumption by only connecting when adequate signal quality is available and improve network capacity through load sharing. In addition, this will also improve user perception as users will experience good service when connected to the allowed wireless APs. The RSSI threshold value can be fixed or expressed in relation to individual wireless AP information e.g. the "Basic Service Set Load" information element. The latter is suitable if there are several wireless APs 212a-212c within one RAN cell 206, where it may unsuitable to set compromise values applicable for all wireless APs 212a-212c;

D. Identification of the operator wireless network (e.g. in Wi-Fi this may be the SSID or BSID); and/or E. Preference for wireless network access (e.g. Wi-Fi). This information tells UE 210a if wireless network access is preferred or not.

For type E information, should wireless network access not be preferred (e.g. due to overloading of the wireless network 204), the wireless AP information may further include other access information related to a preferred RAN 202 or base station 208 in the mobile network that the UE 210a may access instead. For example, the wireless AP information may indicate that the UE 210a may access base station 208 or 3GPP RAT or other available base station (should base station 208 become overloaded) for providing mobile broadband access in place of accessing a wireless network or AP.

Once generated, the wireless AP information is provided to the UE 210a via the RAN 202. For example, if RAN 202 is a 3GPP RAN, then the wireless AP information may be provided in 3GPP cells 206, which 3GPP UE 210a will be required to monitor continuously as this requires minimum power consumption of the UE battery and also requires minimum effort to acquire.

As described above, the different ways to provide the wireless AP information to the UE 210 via RAN 202 include a) use of broadcasted system information in a cell 206; or b) use of dedicated signalling between UE 210a and the RAN 202 via the base station 208 serving UE 210a.

The use of broadcasted system information is applicable to all RANs e.g. this can be any system information in any of the radio access technologies (RATs) (i.e. GSM, W-CDMA/HSPA, LTE, and LTE-Advanced etc). As an example, System Information Block 7 (SIB 7) in W-CDMA/HSPA is a suitable SIB to include this information. The choice of SIB depends on the type of wireless AP information e.g. information relating to RSSI thresholds can be updated continuously and can only be read by UEs (e.g. UE 210a) when needed. In addition, changes in SIB7 do not impact 'Value Tags' and will thus not force UEs to re-acquire SIBs. Other information for inclusion into the SIBs may include radio band information.

Similarly, the use of dedicated signalling between the UE 210a and the RAN 202 can be based on any signalling format depending on the RAT. For example, dedicated signalling can be any RR, RLC, RRC etc. based signalling in any of the RATs (i.e. GSM, W-CDMA/HSPA, LTE, LTE-Advanced and beyond). As an example, dedicated signalling may carry all types of wireless AP information (e.g. any of the wireless AP information A-E as described above). In particular, dedicated signalling may carry the preference for wireless network access (e.g. type E information) as it allows change of access priority during ongoing communication, based on network knowledge of service and other factors.

The network entity 215 may select the wireless AP information based on the following principles:

Different wireless AP information settings can be used for broadcast system information (e.g. SI/SIB) in different RATs, which means different behaviour can be achieved depending on the current RAT that the UE 210a is in communication with.

The wireless AP information can be set dynamically and changed as needed, which may be based, by way of example only, on the network entity 215 receiving the following information:

Load in the current RAN cell 206 (e.g. GSM, WCDMA/HSPA or LTE cell);

Load in the wireless network 204 cell (e.g. Wi-Fi cell) indicated;

The network entity 215 may also receive this information using dynamic load exchange between RATs (e.g. 3GPP RATs) and wireless networks (e.g. Wi-Fi);

Changes to user profiles or subscriptions;

Load in core network parts of the communication system 200.

In addition, the network entity 215 may have knowledge from the network information about the total situation in a geographical area of communication system 200 (e.g. see FIG. 2b) and may use this knowledge while generating and setting the wireless AP information for UE 210a. The network entity 215 may also assist in the above mentioned load exchange between RATs (e.g. 3GPP) and wireless networks (e.g. Wi-Fi).

FIG. 2b is a schematic illustration another communication system 200 including another example network entity 215 according to the invention, the communication system 200 including a first and a second UE 210a and 210b in communication with at least one of several RANs 202a, 202b, 202c and/or several wireless networks 204a and 204b. In this example, the communication system 200 includes a GSM RAN 202a including a base station 208a and base station controller (BSC) 209a, a W-CDMA RAN 202b including a nodeB 208b and a radio network controller (RNC) 209b, and a 3GPP RAN 202c including a enodeB 208c. The RANs 202a, 202b, and 202c are in communication with the network entity 215 as illustrated by the dashed lines. The wireless network 204a includes a wireless AP 212a based on Wi-Fi or the IEEE 802.11 standard and a corresponding wireless AC 213a. The wireless network 204b includes a first wireless AP 212b and a second wireless AP 212c and corresponding wireless ACs 213b and 213c. In this example, both wireless networks 204a and 204b are also in communication with network entity 215. For simplicity, the core network elements connecting the RANs 202a-202c to further IP networks (e.g. IP networks 218) and connecting the wireless networks 204a-204b to the further IP networks are not shown.

In addition to the functionality as described with reference to FIG. 2a and/or FIGS. 3a-4, network entity 215 includes network logic that has at least a control plane interface to the different RATs represented by RANs 202a, 202b and 202c. The network entity 215 has access to the UE context and different UE information in both RAN 202a-202c and wireless network 204a-204b (e.g. 3GPP and Wi-Fi) sides. The network entity 215 also has access to RAN 202a-202c, core network parts (not shown), and wireless network 204a-204b network information and takes part in the access selection and traffic steering decisions.

Having access to network information from these different RATs (e.g. RAN 202a-202c, core network parts (not shown), and wireless network 204a-204b) allows the network entity 215 to have knowledge about the total network situation in at least a geographical area of communication network 200. This means that network entity 215 can use this knowledge while generating and setting the wireless AP information for UEs 210a and 210b. Each UE 210a and 210b may receive generic wireless AP information about one or more of wireless APs 212a-212c broadcast from one of the base stations 208a-208c depending on the RAN 202a-202c each UE 210a and 210b is in communication with. Each UE 210a and 210b may also receive specific wireless AP information associated with a selection of the available wireless APs 212a-212c that network entity 215 decides is suitable for each UE 210a and 210b.

FIG. 2c is a schematic illustration a further communication system 200 including a further example network entity 215 according to the invention. The communication system 200 includes a UE 210a in communication with a base station 208, which may be based on 2G, 3G, and 4G or beyond 4G network technologies. The base station 208 includes radio access technologies 216 and the functionality of network entity 215. The network entity 215 may have the functionality as described with reference to FIGS. 2a and 2b and/or FIGS. 3a-3b. The network entity 215 will have access to network information such as the local load of the base station 208 serving the cell and UE 210a and may have access via RAT 216 and the IP networks to the RAN(s), core network parts (not shown) and wireless network(s) and wireless AP 212a for use in generating wireless AP information for transmission to UE 210a.

FIG. 2d is a schematic illustration of a base station 220 supporting both cellular and wireless network access RATs 208d and 212b and incorporating an additional example of network entity 215 according to the invention. The functionality of network entity 215 has been incorporated into base station 220. The network entity 215 may again have at least some of the functionality of network entity 215 as described with reference to FIGS. 2a-2c and/or FIGS. 3a-3b. In this example, the base station 220 may be a combined Pico/femto and Wi-Fi base station that includes RAN and wireless network technology such as, by way of example only, 3GPP RAT(s) and Wi-Fi. The information exchange between 3GPP and Wi-Fi can be made locally to network entity 215, or it can be via a central point as described with respect to FIGS. 2a and 2b.

Figure 2E:
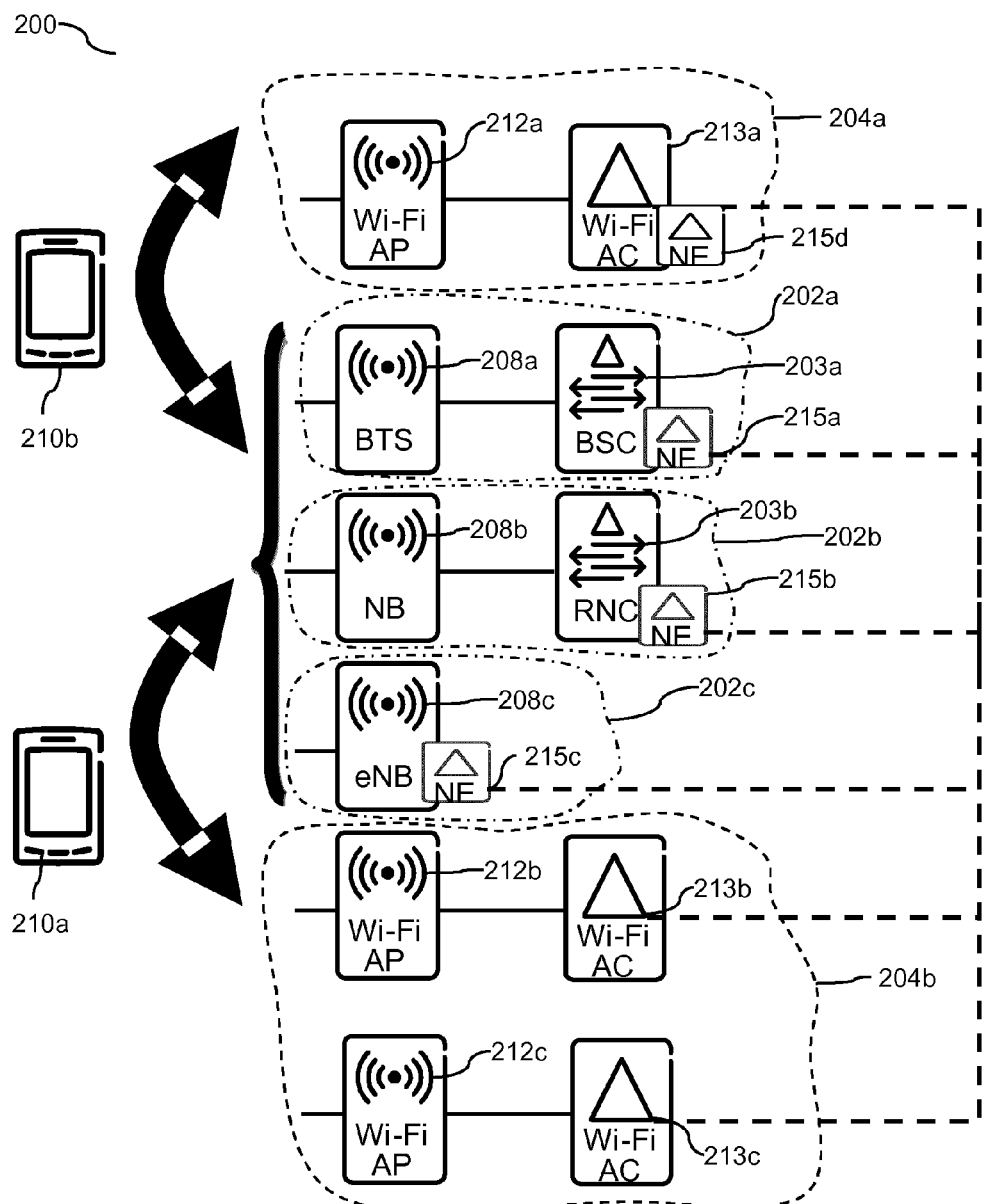
FIG. 2e is a schematic illustration of a communication system including several network entities according to the invention.

FIG. 2e is a schematic illustration of a communication network 200 including an example of one or more BSCs, one or more RNCs and one or more base stations (e.g. eNB) incorporating a network entity or including the functionality of a network entity 215 according to the invention. In this example, each RAN 202a-202c includes the functionality of a network entity 215a-215c, respectively. In addition, wireless access network 204a includes the functionality of a network entity 215d, while wireless access network 204b does not include the functionality of a network entity. In RAN 202a, the BSC 203a includes the functionality of network entity 215a, in RAN 202b, the RNC 203b includes the functionality of network entity 215b, and in RAN 202c the eNB 208a includes the functionality of network entity 215c. In wireless network 204a the Wi-Fi AC 213a includes the functionality of a network entity 215d. Each network entity 215a-215d may again have at least some of the functionality of network entity 215 as described with reference to FIGS. 2a-2c and/or FIGS. 3a-3b. In wireless network 204b, the wireless APs 212b-212c and/or wireless ACs 213b-213c may be in communication with network entities 215a-215d and provide network information associated with the wireless network 204b resources to the network entities 215a-215d.

In operation, each network entity 215a-215d is in communication with the other network entities 215a-215d, the RANs 202a-202c, and wireless ANs 204a and 204b or other network nodes/elements/entities or core network parts (not shown) that may provide network information associated with at least RAN 202a-202c resources, core network part resources, and/or wireless network 204a-204b resources. This allows network information or even wireless AP information exchange between the RANs 202a-202c and the wireless access network 204a to be made via the network entities 215a-215d. The network information may be collected and stored in each network entity 215a-215d such that that at least one or all of the network entities 215a-215d have a "total network level of information" or at least a "total local network level of information" about the RAN, core network part, and/or wireless network resources. This will further impact the accuracy or optimality of decisions made in the network entities 215a-215d when generating the wireless AP information for UEs 210a-210b.

For example, if the current RAT (e.g. eNB 208c of RAN 202c may serve UE 210a) is overloaded the information sent from one of the network entities 215a-215c (e.g. network entity 215c) to a UE 210a could indicate that some specific Wi-Fi AP (e.g. Wi-Fi AP 212b) is preferred. However, if the current RAT (e.g. eNB 208c of RAN 202c serving UE 210a) also receives information from another RAT (e.g. BSC 209a of RAN 202a, or another eNB (not shown) or 3GPP RAT) that is not loaded then the preference could be to move the UE to that RAT (e.g. BSC 209a of RAN 202a, or another eNB (not shown) or 3GPP RAT) and not indicate any Wi-Fi AP preference. This allows a network entity 215c to notify a first UE 210a about the most optimal set of wireless APs and even other mobile networks the first UE may access instead of a wireless AP, which further optimises the use of RAN and wireless network resources.

In another example, if BTS 208a serves a second UE 210b and wireless network 204a is overloaded, this network information may be sent from network entity 215d to network entity 215a. Network entity 215a may use this network information to generate or change the set of wireless APs to exclude Wi-Fi AP 212a from the set of wireless APs and send UE 210b updated wireless AP information via BTS 208a. The network information can also be sent directly from the wireless AP 212a and/or wireless AC 213a of wireless network 204a. The wireless AP information may indicate that another specific Wi-Fi AP (e.g. Wi-Fi AP 212b) may be preferred (if it is in range) or a preference that UE 210b access RAN 202a instead of wireless network 204a.

Alternatively, network entity 215d may send updated wireless AP information to UE 210b via BTS 208a indicating wireless AP 212a is not a preferred wireless AP for UE 210b to access. In addition, if the Wi-Fi AC 213a (e.g. network entity 215d) receives network information from another RAT or from wireless network 204b (e.g. from wireless APs 212b or 212c or even wireless ACs 213b or 213c) that it is not loaded, then the updated wireless AP information may include information indicating a preference to move the UE to that RAT or use wireless APs 212b or 212c of wireless network 204b. This allows network entities 215c or 215d to notify UE 210b about changes in the network and provide an optimal set of wireless APs that UE 210b may access and/or even other mobile networks the UE 210b may access (e.g. use mobile broadband via a mobile network or RAN 202a-202c instead of via a wireless network 204a or 204b). This optimises the use of network information associated with RAN and/or wireless network resources.

In a further example, if the eNB 208*c* may be serving the first UE 210*a*, then the network entity 215*c* may receive network information associated with RAN resources from RANs 202*a*-202*c* (e.g. via network entities 215*a*-215*b*, or BTS 208*a*, NB 208*b*, BSC 203*a*, RNC 203*b*), core network resources (e.g. via network entities 215*a*-215*b* or any other core network part node or network element/entity), and/or wireless access networks 204*a* and 204*b* (e.g. via network entity 215*d*, or wireless APs 212*a*-212*c* or wireless ACs 213*a*-213*c*), and network entities 215*a* and 215*b*. This provides network entity 215*c* with sufficient network information to determine the best set of wireless APs that the first UE 210*a* may access (this may include not accessing a wireless AP at all—e.g. the set of wireless APs may be empty or the wireless AP information may indicate a low preference for accessing the set of wireless APs and so the first UE 210*a* may access another RAT etc).

The multiple network entities 215*a*-215*d* may form a distributed system that allows the network entities 215*a*-215*c* to generate wireless AP information based on the most up-to-date network information or wireless AP information from other network entities. This also allows the network information associated with RAN resources, core network part resources, and wireless access network resources to be shared or distributed over the communication system 200 and thus used to generate dynamic and optimal wireless AP information enabling UEs 210*a*-210*b* to determine the best or most appropriate wireless APs 212*a*-212*c* to access or not (as the case may be).

Figure 3A:
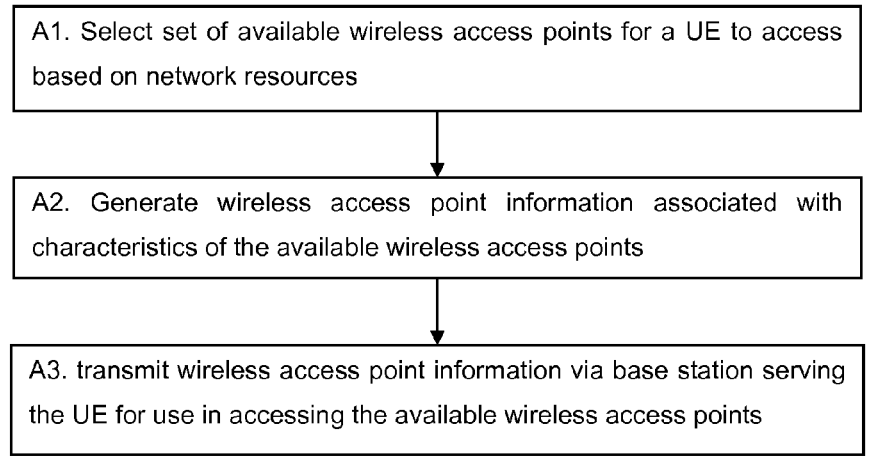
FIG. 3a is a flow diagram illustrating an example process according to the invention.

FIG. 3*a* is a flow diagram illustrating an example process for operating a network entity according to the invention. The network entity is for use in a communications network, the communications network including a RAN (e.g. 2G/3G/4G and beyond) and a wireless network (e.g. IEEE 802.11, Wi-Fi). The RAN includes a base station serving a UE. The wireless network includes one or more wireless APs. The process includes the steps of:

A1. Selecting a set of available wireless APs from the one or more wireless APs for use by the UE based on network information associated with RAN resources, core network part resources, and/or wireless network resources;

A2. Generating wireless AP information associated with the characteristics of the set of available wireless AP for use in applying with access rules to the available wireless APs; and A3. Transmitting the wireless AP information via the base station to the UE for use by the UE to access an available wireless AP.

It is to be appreciated by the person skilled in the art that the network information may at least be provided by network nodes/elements in the RAN, or core network parts of the communications network, and/or by wireless APs or wireless access controllers within the wireless network. Should there be multiple network entities then the network information and/or wireless AP information may be shared between the network entities. Although the wireless AP information may include data for use with rules (or access rules) present on the UE, it is to be appreciated that the wireless AP information may also include rules or access rules for use by the UE in identifying and determining whether a suitable available wireless AP may be accessed.

Figure 3B:
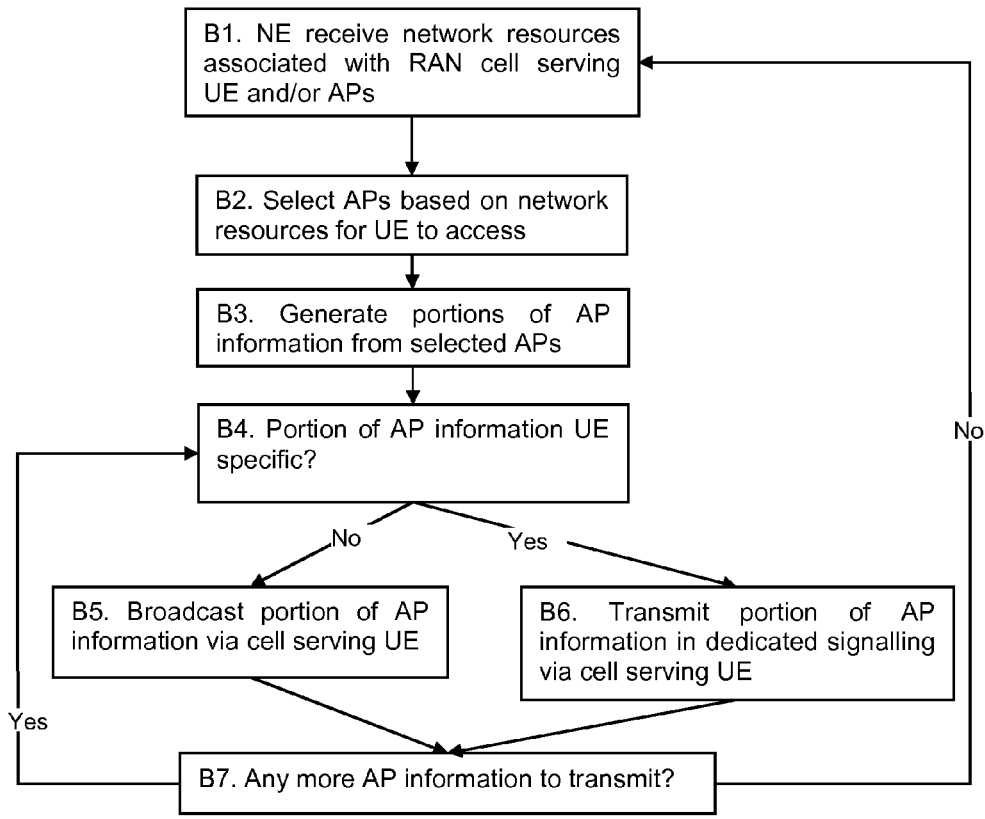
FIG. 3b is a flow diagram illustrating another example process according to the invention.

FIG. 3*b* is another flow diagram illustrating another example process for operating a network entity according to the invention. The network entity is for use in a communications network, the communications network including a RAN (e.g. 2G/3G/4G and beyond) and a wireless network (e.g. IEEE 802.11, Wi-Fi). The RAN includes a base station serving a UE. The wireless network including one or more wireless APs. The process includes the steps of:

B1. Receiving by the network entity network information associated with network resources such as at least a RAN cell/base station serving the UE, RAN resources (e.g. base station loads, 3GPP RAN network loads, signal strengths etc), core network part resources (e.g. user profiles/subscriptions), and/or wireless network resources (e.g. Wi-Fi AP load or signal strengths etc.).

B2. Selecting a set of available wireless APs from the one or more wireless APs for use by the UE based on the received network information associated with RAN resources, core network part resources, and/or the wireless network resources.

B3. Generating portions of wireless AP information that are generic to all UEs and that are specific to the UE, the wireless AP information associated with the characteristics of the set of available wireless APs.

B4. Determining whether a portion of the wireless AP information not sent is UE specific. If the portion of wireless AP information is UE specific, then proceed to step B6. Otherwise, proceed to step B5.

B5. Transmitting the portion of wireless AP information by broadcasting (B4, B5, B7) the portion of the wireless AP information in broadcast system information via the base station to the UE for use by the UE in accessing an available wireless AP. Proceed to step B7.

B6. Transmitting the portion of the wireless AP information using dedicated signalling between the UE and the RAN via the base station. Proceed to step B7.

B7. Determine whether any further portions of wireless AP information to be transmitted. If further portions of wireless AP information are to be transmitted, then proceed to step B4. Otherwise proceed to step B1.

Although the wireless AP information may include data for use with rules (or access rules) present on the UE, it is to be appreciated that the wireless AP information may also include rules or access rules for use by the UE in identifying and determining whether a suitable available wireless AP may be accessed.

As an option, in step B5, the portion of wireless AP information that is broadcast may include at least one minimum RSSI associated with one or more of the available wireless APs for use by the UE when accessing an available wireless AP satisfying the minimum RSSI.

As an option, in step B6, the portion of the wireless AP information transmitted using dedicated signalling can be based on network information associated with the UE context in the RAN and/or core network parts to provide specific rules for the UE when accessing one of the available wireless APs. The UE context in the RAN and/or core network parts may include UE information associated with at least one of the UE subscription, the UE's capabilities, mobility of the UE, and radio conditions specific to the UE, etc. In step B6, the portion of wireless access point information may include preference information associated with whether access to an available wireless AP is preferred or not.

The wireless AP information transmitted in any of steps B5 or B6 may further include one or more of the following characteristics (or rules): an indication of whether or not a set of available wireless APs exist in the cell serving the UE; radio band information associated with the available wireless APs; identity information associated with each available wireless AP; at least one minimum received signal strength indication, RSSI, associated with one or more of the available wireless APs for use by the UE to access an available wireless AP satisfying the minimum RSSI; providing a minimum RSSI for each available wireless AP; and preference information associated with whether access to an available wireless AP is preferred or not.

Optionally, in step B2, the available wireless APs may be based on network information associated with RAN resources including the RAN load on the cell/base station serving the UE. In addition, the available wireless APs may be selected based on further network information associated with wireless access network (wireless network or WLAN) resources including the network load on the one or more wireless APs (e.g. IEEE 802.11 or Wi-Fi APs). Additionally, the available wireless APs may be selected based on other network information associated with core network part resources including the user subscriptions, user profiles or service information associated with the user or UE. Further, the available wireless APs may be selected based on the type of RAN serving the UE. It is to be appreciated that wireless APs may be based on the IEEE 802.11 standard or based on Wi-Fi.

It is to be appreciated by the person skilled in the art that the network information may at least be provided by network nodes/elements in the RAN, or core network parts of the communications network, and/or by wireless APs or wireless access controllers within the wireless network.

Figure 4:
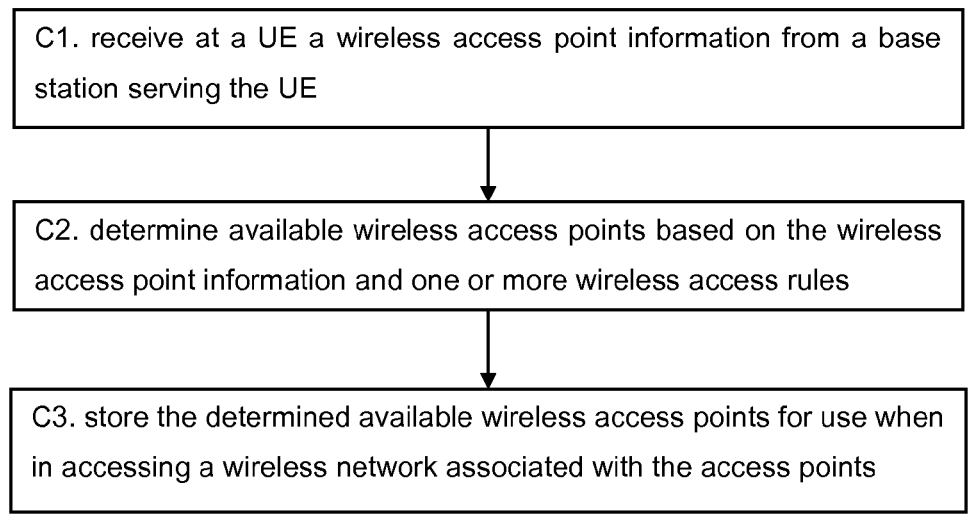
FIG. 4 is a flow diagram illustrating a further example process according to the invention.

FIG. 4 is a flow diagram illustrating a further example process for operating a UE according to the invention. The UE is in a communications network including a RAN and a wireless network. The RAN includes a cell comprising a base station serving the UE, and the wireless network includes one or more wireless APs. The process performs the following steps of:

C1. Receiving, from a network entity in the communications network via the base station, wireless AP information associated with a set of available wireless APs from the one or more wireless APs;

C2. Determining the available wireless APs the UE can access based on applying the wireless AP information with access rules for accessing the available wireless APs; and C3. Storing wireless network access information associated with the determined available wireless APs, the wireless network access information for use by the UE when accessing the wireless network via the determined available wireless APs.

Although the wireless AP information may include data for use with rules (or access rules) present on the UE, it is to be appreciated that the wireless AP information may also include rules or access rules for use by the UE in identifying and determining whether a suitable available wireless AP may be accessed. It is to be appreciated that wireless APs may be based on the IEEE 802.11 standard or based on Wi-Fi.

Figure 5A:
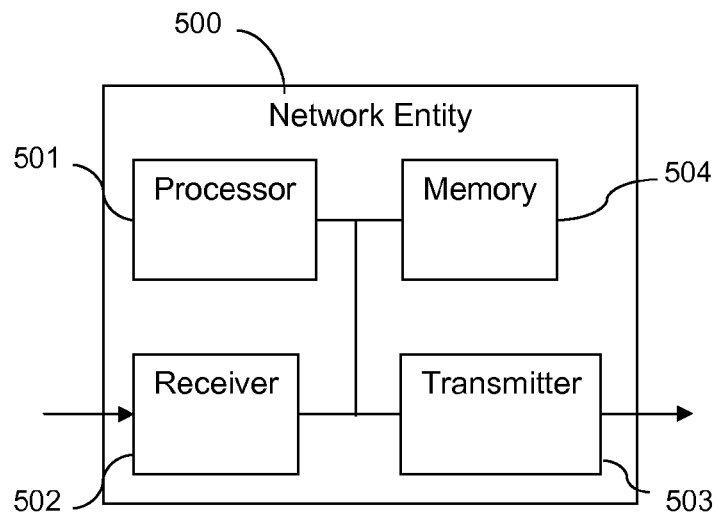
FIG. 5a is a schematic illustration of an example network entity according to the invention.

FIG. 5a is a schematic illustration of an example network entity 500 or apparatus according to the invention for use in a communications network. The communications network includes a RAN and a wireless network. The RAN including a base station serving the UE, and the wireless network including one or more wireless APs. The network entity 500 comprising a processor 501, a receiver 502, a transmitter 503, and a memory 504, the processor 501 being coupled to the receiver 502, the transmitter 503 and the memory 504.

In operation, the processor 501 is configured to select a set of available wireless APs from the one or more wireless APs for use by the UE based on network information associated with RAN resources, core network part resources, and/or the wireless network resources. The processor 501 is further configured to generate wireless AP information associated with the characteristics of the set of available wireless APs for use by the UE in applying access rules to access the set of available wireless AP. The transmitter 503 is configured to transmit the wireless AP information via the base station to the UE.

The transmitter 503 is configured to broadcast a first portion of the wireless AP information in broadcast system information to one or more UEs. The first portion of wireless AP information includes non-UE-specific wireless AP information for use with the access rules when accessing the set of available wireless APs. The transmitter 503 may be further configured to transmit a second portion of the wireless AP information using dedicated signalling between the UE and the RAN. The second portion of the wireless AP information transmitted using dedicated signalling may be based on the information specific to the UE. For example, the information may be associated with a UE context in the RAN and/or core network part for use with specific access rules for the UE when accessing one of the set of available wireless APs.

The wireless AP information may include one or more of the following characteristics or conditions/rules: an indication of whether or not a set of available wireless APs exist in the cell serving the UE; radio band information associated with the set of available wireless APs; identity information associated with each available wireless AP; at least one minimum RSSI indication associated with one or more of the available wireless APs for use by the UE when accessing an available wireless AP satisfying the minimum RSSI; providing a minimum RSSI for each available wireless AP; and preference information associated with whether access to an available wireless AP is preferred or not.

The processor 501 may be further configured to select the available wireless AP based on network information associated with RAN resources including, by way of example only, the RAN load on the cell serving the UE. The processor 501 may be further configured to select the available wireless APs based on network information associated with wireless access network resources including, by way of example only, the wireless network load on the one or more wireless APs. The processor 501 may be further configured to select the available wireless APs based on network information associated with core network part resources including, by way of example only, the user subscriptions/profiles, or core network load, or user plane traffic. The processor 501 may be further configured to select the available wireless APs based on the type of RAN serving the UE.

The receiver 502 may be configured to receive, from the RAN, network information associated with RAN information representative of the RAN resources. The RAN resources may be associated with at least the cell/base station serving the UE. It is to be appreciated by the person skilled in the art that the network entity 500 may receive network information associated with RAN or communication network resources transmitted by at least one or more network nodes/elements/entities in the RAN(s) or core network part(s) of the communications network. The memory 504 is configured to store the network information for analysis and use in selecting the set of available wireless APs. The receiver 502 may be further configured to receive, from the core network parts, other network information representative of the core network part resources associated with the user(s) or UE(s). The receiver 502 may be further configured to receive, from the wireless network, further network information representative of the wireless network resources associated with the one or more wireless APs or ACs. It is to be appreciated by the person skilled in the art that the network entity 500 may receive the further network information associated with wireless network resources transmitted by wireless APs or wireless access controllers within the wireless network. The memory 504 may be further configured to store the further network information.

The network entity 500 may be a standalone entity that is in communication with one or more RANs and one or more wireless networks. The network entity 500 may be incorporated into a base station serving the UE and a wireless access point. Alternatively, the network entity 500 may be incorporated into a base station including RAT technology and wireless AP technology, for example, the network entity 500 may be included as a pico/femto base station.

The receiver 502 and processor 501 are configured to receive further sets of wireless APs or further network information from one or more further network entities according to the invention. The one or more further network entities being located within the communication system. The processor 501 is further configured to generate the set of wireless APs based on the received further network information or further sets of wireless APs. The memory 504 may be configured to store the further network information and/or sets of wireless APs.

Additionally, the transmitter 503 and processor 501 may be further configured to transmit the sets of wireless APs and/or said network information to one or more further network entities within the communication system. The processor 501 is further configured to generate the set of wireless APs based on the received further network information or further sets of wireless APs.

Additionally or alternatively, the functionality of the network entity 500 may be included as a network entity function in one or more RAN network elements such as base station controllers (BSC), one or more radio network controllers (RNC), and/or one or more base stations, wherein each network entity function is in communication with one or more other network entity functions for receiving/transmitting network information. For example, network information based on RAN and/or wireless network resources of the communication system and/or in the vicinity of the respective network entity function.

Figure 5B:
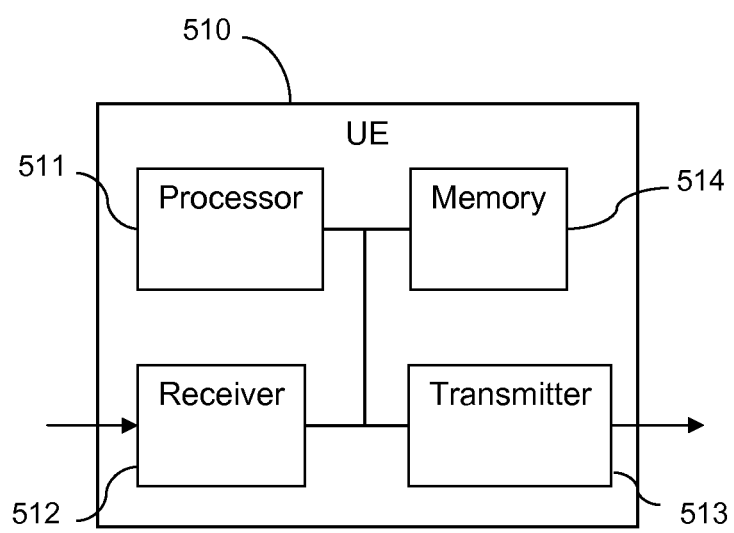
FIG. 5b is a schematic illustration of an example user equipment according to the invention.

FIG. 5b is a schematic illustration of an example UE 510 according to the invention. The UE 510 may be for use in a communications network, the communications network including a RAN and a wireless network. The RAN including a base station serving the UE 510. The wireless network including one or more wireless APs. The UE 510 comprising a processor 511, a receiver 512, a transmitter 513 and a memory 514, the processor 511 being coupled to the receiver 512, the transmitter 513 and the memory 514. The receiver 512 may be a dual mode receiver and/or include at least a cellular receiver for communicating with the RAN and a wireless AP receiver (e.g. a transmitter based on the IEEE 802.11 standard) for communicating with the wireless network. The transmitter 513 may be a dual mode transmitter and/or include at least a cellular transmitter for communicating with a RAN and a wireless AP transmitter (e.g. a transmitter based on the IEEE 802.11 standard) for communicating with a wireless network. In addition or alternatively, the receiver 512 and transmitter 513 may be in the form of one or more transceivers capable of communicating with the RAN and wireless network.

In operation, the receiver 512 is configured to receive, from a network entity 500 in the communications network via the base station, wireless AP information associated with a set of available wireless APs from the one or more wireless APs. The processor 511 is configured to determine the available wireless APs the UE 510 can access based on applying the wireless AP information with access rules associated for accessing the available wireless APs. The memory 514 is configured to store wireless network access information associated with the determined available wireless APs, the wireless network access information for use by the processor 511 and transmitter 513 when the UE 500 accesses the wireless network 204 via a determined available wireless AP.

Although the wireless AP information may include data for use with rules (or access rules) present on the UE 500, it is to be appreciated that the wireless AP information may also include rules or access rules for use by the UE 500 in identifying and determining whether a suitable available wireless AP may be accessed. It is to be appreciated that wireless APs may be based on the IEEE 802.11 standard or based on Wi-Fi.

The network entity 500 and UE 510 as herein described can include memory units 504 and 514 and processors 501 and 511, which can be used for storing and executing a computer program, comprising computer readable code which, when executed by the processors 501 and 511, respectively, causes the network entity 500 and UE 510 to perform the relevant methods, procedures, or processes of the invention as described herein. Such computer programs as described herein can be incorporated within one or more computer program products, each comprising a computer readable medium and one or more of the computer programs, where one or more of the computer programs are stored on the computer readable medium.

Although the invention has been described in terms of examples or preferred embodiments as set forth above, it should be understood that these examples or embodiments are illustrative only and that the claims are not limited to those examples or embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of operating a network entity within a radio access network of a communications network comprising the radio access network and a wireless network, the radio access network including a base station serving a user equipment (UE) and the wireless network including one or more wireless access points, the method comprising:
    selecting a set of available wireless access points from the one or more wireless access points based on network information associated with radio access network resources and wireless network resources, wherein said network information associated with radio access network resources comprises one or more of information relating to UE mobility, radio access network load, radio access network cell load, and radio access network radio link performance;
    generating wireless access point information associated with the characteristics of the set of available wireless access points for use by the UE in accessing an available wireless access point; and transmitting the wireless access point information via the base station to the UE, wherein:

the step of generating wireless access point information further includes generating one or more rules or conditions for use by the UE in accessing a wireless access point from the set of wireless access points, and the transmitted wireless access point information includes the one or more rules or conditions for use by the UE in accessing the wireless access point from the set of wireless access point.

2. The method according to claim 1, wherein the step of transmitting includes broadcasting a first portion of the wireless access point information in broadcast system information.

3. The method according to claim 2, wherein the first portion of wireless access point information includes non-UE-specific wireless access point information for use in applying access rules when accessing the set of available wireless access points.

4. The method according to claim 2, wherein the first portion includes at least one minimum received signal strength indication, RSSI, associated with one or more of the available wireless access points for use by the UE when accessing an available wireless access point satisfying the minimum RSSI.

5. The method according to claim 1, wherein the step of transmitting includes transmitting a second portion of the wireless access point information using dedicated signalling between the UE and the radio access network.

6. The method according to claim 5, wherein the second portion of the wireless access point information transmitted using dedicated signalling is based on network information associated with at least the UE context in the radio access network or a core network part of communication network to provide specific rules for the UE when accessing one of the available wireless access points.

7. The method according to claim 6, wherein the UE context in the radio access network or the core network part of communication network includes UE information associated with at least one of:

the UE subscription;
the UE capabilities;
mobility of the UE; and
radio conditions specific to the UE.

8. The method according to claim 5, wherein the second portion of wireless access point information includes preference information associated with whether access to an available wireless access point is preferred or not.

9. The method according to claim 5, wherein the wireless access point information includes one or more of the following characteristics:

an indication of whether or not a set of available wireless access points exist in the cell serving the UE;
radio band information associated with the available wireless access points;
identity information associated with each available wireless access point;
at least one minimum received signal strength indication, RSSI, associated with one or more of the available wireless access points for use by the UE to access an available wireless access point satisfying the minimum RSSI;
providing a minimum RSSI for each available wireless access point; and
preference information associated with whether access to an available wireless access point is preferred or not.

10. The method according to claim 1, wherein the step of selecting the available wireless access points is based on network information further comprising at least one from the group of:

wireless network resources including the wireless network load on the one or more wireless access points;
the type of radio access network serving the UE;
wireless network resources associated with the one or more wireless access points; and
communication network or core network part resources associated with user traffic, a user subscription associated with the UE, or service information.

11. The method according to claim 1, wherein the wireless network is a wireless local area network.

12. The method according to claim 1, wherein the wireless network is based on the IEEE 802.11 standard.

13. The method according to claim 1, wherein the wireless access points are Wi-Fi access points.

14. The method according to claim 1, further comprising:

receiving further network information from one or more further network entities;
updating the network information with the further network information;
the step of selecting further includes selecting further sets of available wireless APs based on the updated network information;
the step of generating further includes generating the further wireless AP information based on the further sets of available wireless APs; and
the step of transmitting further includes transmitting the at least a portion of said network information to the one or more further network entities;
the step of transmitting further includes transmitting the at least a portion of said wireless AP information to the UE via the base station.

15. A method for operating a UE in a communications network, the communications network comprising a radio access network and a wireless network, the radio access network including a base station serving the UE, and the wireless network including one or more wireless access points, the method comprising:

receiving, from a network entity in the radio access network via the base station, wireless access point information associated with a set of available wireless access points from the one or more wireless access points, wherein the wireless access point information received from the network entity comprises one or more rules or conditions generated by the network entity for use by the UE in accessing the set of wireless APs; wherein the selection of available wireless points at the network entity is based on network information associated with radio access network resources comprising one or more of information relating to UE mobility, radio access network load, radio access network cell load, and radio access network radio link performance;
determining the available wireless access points the UE can access based on applying the wireless access point information with the one or more rules or conditions for accessing the available wireless access points; and
storing wireless network access information associated with the determined available wireless access points, the wireless network access information for use by the UE when accessing the wireless network via the determined available wireless access points.

16. A network entity for use in a communications network, the communications network comprising a radio access network and a wireless network, the radio access network including a base station serving the UE, and the wireless network including one or more wireless access points, the network entity comprising:
- a processor, a receiver, a transmitter, and a memory, the processor being coupled to the receiver, the transmitter and the memory, wherein:
- the processor is configured to select a set of available wireless access points from the one or more wireless access points for use by the UE based on network information associated with radio access network resources and wireless network resources, wherein said network information associated with radio access network resources comprises one or more of information relating to UE mobility, radio access network load, radio access network cell load, and radio access network radio link performance;
- the processor is further configured to generate wireless access point information associated with the characteristics of the set of available wireless access points for use by a UE to access the set of available wireless access points; and
- the transmitter is configured to transmit the wireless access point information via the base station to the UE,
- wherein when generating wireless access point information, the processor is further configured to generate one or more rules or conditions for use by the UE in accessing a wireless access point from the set of wireless access points, and
- wherein when transmitting the wireless access point information, the transmitter is further configured to transmit wireless access point information including the one or more rules or conditions for use by the UE in accessing the wireless access point from the set of wireless access points.

17. The network entity according to claim 16, wherein the transmitter is configured to broadcast a first portion of the wireless access point information in broadcast system information.

18. The network entity according to claim 17, wherein the first portion of wireless access point information includes non-UE-specific wireless access point information for use with the access rules when accessing the set of available wireless access points.

19. The network entity according to claim 16, wherein the transmitter is configured to transmit a second portion of the wireless access point information using dedicated signalling between the UE and the radio access network.

20. The network entity according to claim 19, wherein the second portion of the wireless access point information transmitted using dedicated signalling is based on network information associated with the UE context in the radio access network or core network part of communications network for use with specific access rules for the UE when accessing one of the set of available wireless access points.

21. The network entity according to claim 16, wherein wireless access point information further comprising one or more of the following:
- an indication of whether or not a set of available wireless access points exist in the cell serving the UE;
- radio band information associated with the set of available wireless access points;
- identity information associated with each available wireless access point;
- at least one minimum received signal strength indication, RSSI, associated with one or more of the available wireless access points for use by the UE when accessing an available wireless access point satisfying the minimum RSSI;
- providing a minimum RSSI for each available wireless access point; and
- preference information associated with whether access to an available wireless access point is preferred or not.

22. The network entity according to claim 16, wherein the processor is further configured to select the available wireless access points based on network information comprising at least one from the group of:
- type of radio access network serving the UE;
- wireless network resources including the wireless network load on the one or more wireless access points;
- wireless network resources associated with the one or more wireless access points; and
- communication network or core network part resources associated with user traffic, a user subscription associated with the UE, or service information.

23. The network entity according to claim 16, wherein:
- the receiver is configured to receive network information from the radio access network;
- the receiver is further configured to receive network information from the wireless network;
- the receiver is further configured to receive network information from a core network part of the communications network;
- the memory is configured to store the network information.

24. The network entity according to claim 16, wherein the wireless AP information includes one or more rules or conditions for use by the UE in accessing a wireless AP from the set of wireless APs; and
- the processor is further configured to generate one or more rules or conditions for use by the UE in accessing the set of wireless APs.

25. The network entity according to claim 16, wherein:
- the receiver is configured to receive further network information from one or more further network entities;
- the processor is further configured to update the network information with the received further network information for use in selecting sets of wireless APs and generating further wireless AP information; and
- the transmitter is further configured to transmit the at least a portion of the updated network information to the one or more further network entities;
- the transmitter is further configured to transmit the further wireless AP information to the UE via the base station.

26. The network entity according to claim 16, wherein the wireless network is a wireless local area network.

27. The network entity according to claim 16, wherein the wireless network is based on the IEEE 802.11 standard.

28. A user equipment for use in a communications network, the communications network comprising a radio access network and a wireless network, the radio access network including a base station serving a user equipment, UE, and the wireless network including one or more wireless access points, the UE comprising:
- a processor, a receiver, a transmitter and a memory, the processor being coupled to the receiver, the transmitter and the memory, wherein:
- the receiver is configured to receive, from a network entity in the radio access network via the base station, wireless access point information associated with a set of available wireless access points from the one or more wireless access points, wherein the wireless access point information received from the network entity comprises one or more rules or conditions generated by the network entity for use by the UE in accessing the set of wireless APs, wherein the selection of available wireless points at the network entity is based on network information associated with radio access network resources comprising one or more of information relating to UE mobility, radio access network load, radio access network cell load, and radio access network radio link performance;

the processor is configured to determine the available wireless access points the UE can access based on applying the wireless access point information with the one or more rules or conditions associated for accessing the available wireless access points; and the memory is configured to store wireless network access information associated with the determined available wireless access points, the wireless network access information for use by the processor and transmitter when the UE accesses the wireless network via a determined available wireless access point.

* * * * *